No. 874,251. PATENTED DEC. 17, 1907.
H. F. SCHELLING.
IMPLEMENT FOR MASSAGE, SHAMPOOING, AND OTHER PURPOSES.
APPLICATION FILED MAY 31, 1907.
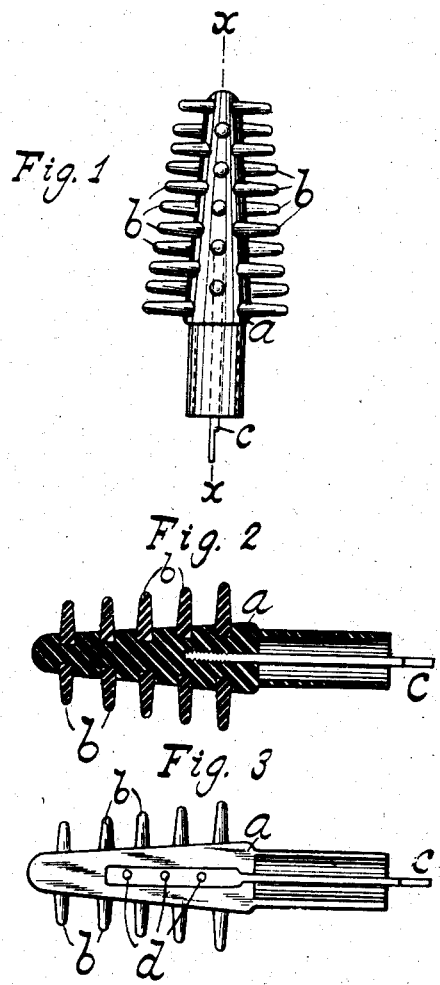
WITNESSES:
INVENTOR
Hermann F. Schelling
BY
ATTORNEY

UNITED STATES PATENT OFFICE.

HERMANN F. SCHELLING, OF WEEHAWKEN, NEW JERSEY.

IMPLEMENT FOR MASSAGE, SHAMPOOING, AND OTHER PURPOSES.

No. 874,251.

Specification of Letters Patent.

Patented Dec. 17, 1907.

Application filed May 31, 1907. Serial No. 376,631.

*To all whom it may concern:*

Be it known that I, HERMANN F. SCHELLING, a citizen of the United States, residing at Weehawken, in the county of Hudson and State of New Jersey, have invented new and useful Improvements in Implements for Massage, Shampooing, and other Purposes, of which the following is a specification.

This invention relates to an implement or tip or terminal of rubber or the like for massage and shampooing apparatus which tip can be applied to such apparatus as shown in my U. S. Patent No. 834,760, dated October 30, 1906.

This invention is set forth in the following specification and claim and illustrated in the annexed drawing, in which:

Figure 1 is an elevation of an implement embodying this invention. Fig. 2 is a section along line $x$ $x$ Fig. 1. Fig. 3 shows a modification.

In the above drawing the letter $a$ designates a body portion of suitable material such as hard rubber. The letter $b$ indicates teeth or projections which are fixed in the body portion in any suitable manner. These teeth $b$ are made of soft or flexible material such as rubber and which will not chafe or injure the skin of the person upon whom the apparatus is used.

Heretofore the teeth were made of hard rubber or the like and which when used upon the face would chafe or injure the skin. An implement of the kind above described, namely with teeth of soft or flexible material, will not roughen or injure the skin.

The body portion $a$ is of conical or taper shape and has a stem $c$ by means of which it can be screwed or fastened in an apparatus or rotary engine. As thus seen the implement can be made in various sizes to fit various sizes of apparatus.

The teeth can be smaller at the end or outer part of the body portion and larger at the base or that portion which is thicker or they could all be of one size or varied as required.

The teeth are a suitable distance apart and are so arranged that the one row of teeth will agitate the lather which is left undisturbed by the spaces between the teeth of another row.

In the modification shown in Fig. 3 the body portion is made of two parts or halves. The stem $c$ has a flattened part which is interposed between the two parts when they are secured together by pins or rivets passing through holes $d$.

What I claim is:

An implement for massage and the like comprising a rotary body portion of hard rubber with soft rubber teeth, said body portion comprising two halves and a stem having a flattened portion secured between said halves.

In testimony whereof I have hereunto set my hand in the presence of two subscribing witnesses.

HERMANN F. SCHELLING.

Witnesses:
 A. C. PHILLIPS,
 JOHN RUCKSTUHL.